United States Patent
Zou et al.

(10) Patent No.: US 9,686,389 B2
(45) Date of Patent: Jun. 20, 2017

(54) AUDIO TRANSDUCER AND ASSOCIATED HOLDING DEVICE FOR ENHANCED ACOUSTIC AND ELECTROMAGNETIC COUPLING

(71) Applicant: Cisco Technology, Inc., San Jose, CA (US)

(72) Inventors: Jian Zou, Shanghai (CN); James Zi Yan He, Cupertino, CA (US); Jinzhu Xue, Nanjing (CN); Wu Xugang, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/929,535

(22) Filed: Nov. 2, 2015

(65) Prior Publication Data
US 2017/0126867 A1  May 4, 2017

(51) Int. Cl.
| | | |
|---|---|---|
| *H04M 1/00* | (2006.01) | |
| *H04M 1/03* | (2006.01) | |
| *H04R 1/28* | (2006.01) | |
| *H04R 1/02* | (2006.01) | |

(52) U.S. Cl.
CPC .............. *H04M 1/03* (2013.01); *H04R 1/025* (2013.01); *H04R 1/2803* (2013.01); *H04R 2499/11* (2013.01)

(58) Field of Classification Search
CPC ....... H04M 1/03; H04R 1/025; H04R 1/2803; H04R 2499/11
See application file for complete search history.

(56) References Cited

U.S. PATENT DOCUMENTS

| | | | | |
|---|---|---|---|---|
| 5,144,656 A | * | 9/1992 | Oku | ........................ H04M 1/03 379/433.03 |
| 6,144,738 A | * | 11/2000 | Hawker | ................... H04M 1/03 379/433.02 |
| 7,418,106 B2 | | 8/2008 | Greuet et al. | |
| 8,750,929 B2 | | 6/2014 | Hawker et al. | |
| 8,923,539 B2 | | 12/2014 | Bren et al. | |
| 9,094,747 B2 | | 7/2015 | Rayner | |
| 2006/0293091 A1 | * | 12/2006 | Hawker | ................... H04M 1/03 455/575.1 |
| 2008/0298627 A1 | * | 12/2008 | Bonebright | ............. H04M 1/03 381/386 |
| 2013/0308786 A1 | | 11/2013 | Sibbald et al. | |

\* cited by examiner

*Primary Examiner* — Tuan D Nguyen
(74) *Attorney, Agent, or Firm* — Parker Ibrahim & Berg LLC; James M. Behmke; Stephen D. LeBarron (57) ABSTRACT

In one embodiment, an apparatus comprises i) an audio transducer; ii) an audio driver plate having an ear-facing side and a non-ear-facing side; iii) a rigid housing substantially circumferentially surrounding the audio driver plate without substantially covering the ear-facing side and non-ear-facing side of the audio driver plate; iv) a front plate mounted on the ear-facing side of the audio driver plate and spaced apart from the audio driver plate; and v) a fixing gasket affixed to the non-ear-facing side of the audio driver plate. In addition, the front plate is adapted to be compressed against an ear-facing portion of an audio transducer holding device and the fixing gasket adapted to be compressed against a non-ear-facing portion of the audio transducer holding device, whereby the audio transducer is adapted to be held within the audio transducer holding device by compressive force on both the fixing gasket and the front plate.

18 Claims, 10 Drawing Sheets

AUDIO TRANSDUCER AND ASSOCIATED HOLDING DEVICE FOR ENHANCED ACOUSTIC AND ELECTROMAGNETIC COUPLING

TECHNICAL FIELD

The present disclosure relates generally to audio transducers, and, more particularly, to audio transducers and associated holding devices (e.g., telephone handsets) for enhanced acoustic and electromagnetic coupling.

BACKGROUND

In general, there are two kinds of standards to ensure the performance of an audio transducer and associated holding device (e.g., telephone handsets, telecommunication system handsets, etc.) on the audio receiving path. One such standard is based on acoustic performance, the conventional manner of using the handset by acoustic coupling to normal human ears. The other standard is the electromagnetic performance for a human who is hearing impaired or otherwise disabled, and that needs to use a hearing aid. Passing the compliance for both acoustic performance and electromagnetic performance simultaneously is very challenging. This is especially true for passing the acoustic compliance standards with an artificial ear (e.g., a "Type 3.3" standard), which is the closest representation to a human ear currently used that can reflect the way people use a listening device (e.g., handset, etc.).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an apparatus comprises i) an audio transducer; ii) an audio driver plate of the audio transducer, the audio driver plate having an ear-facing side and a non-ear-facing side; iii) a rigid housing of the audio transducer, the rigid housing substantially circumferentially surrounding the audio driver plate without substantially covering the ear-facing side and non-ear-facing side of the audio driver plate; iv) a front plate of the audio transducer, the front plate mounted on the ear-facing side of the audio driver plate and spaced apart from the audio driver plate; and v) a fixing gasket affixed to the non-ear-facing side of the audio driver plate. In addition, the front plate is adapted to be compressed against an ear-facing portion of an audio transducer holding device and the fixing gasket adapted to be compressed against a non-ear-facing portion of the audio transducer holding device, whereby the audio transducer is adapted to be held within the audio transducer holding device by compressive force on both the fixing gasket and the front plate.

In one specific embodiment, the fixing gasket comprises an aperture configured to allow air passage to the non-ear-facing side of the audio driver plate.

In another specific embodiment, the apparatus further comprises one or more acoustic leakage pathways formed between the front plate and the ear-facing portion of the audio transducer holding device when the front plate is compressed against the ear-facing portion of the audio transducer holding device, the one or more acoustic leakage pathways configured to allow audio passage from the audio transducer into an interior of the audio transducer holding device.

According to one or more additional embodiments of the disclosure, an audio transducer holding device comprises: i) an ear-facing portion; ii) a non-ear-facing portion, wherein the ear-facing portion and non-ear-facing portion are configured to enclose an audio transducer. In general, the audio transducer may comprising: a) an audio driver plate having an ear-facing side and a non-ear-facing side; b) a rigid housing substantially circumferentially surrounding the audio driver plate without substantially covering the ear-facing side and non-ear-facing side of the audio driver plate; and c) a front plate mounted on the ear-facing side of the audio driver plate and spaced apart from the audio driver plate. The audio transducer holding device of the one or more additional embodiments of the disclosure may further comprise: iii) a fixing gasket configured to compress on a first side against the non-ear-facing side of the audio driver plate and on a second side against the non-ear-facing portion. According to these one or more additional embodiments of the disclosure, the ear-facing portion and non-ear-facing portion are configured to hold the audio transducer by compressing the ear-facing portion against the front plate and the non-ear-facing portion against the fixing gasket.

Description

As noted above, there are generally two kinds of standards to ensure the performance of an audio transducer and associated holding device (e.g., telephone handsets, telecommunication system handsets, etc.) on the audio receiving path. One such standard is based on acoustic performance, the conventional manner of using the handset by acoustic coupling to normal human ears. The other standard is the electromagnetic performance for a human who is hearing impaired or otherwise disabled, and that needs to use a hearing aid. This typically is tested by arranging an integrated induction coil to pick up the electromagnetic signal that corresponds to the acoustic sound waves produced by the telephone handset.

As will be well-understood by those skilled in the art, there are industry standards that cover the acoustic performance (e.g., AS/ACIF S004-2008, PTC 220-2008, etc.) and electromagnetic performance (e.g., FCC Part68-2008, AS/ACIF S040-2001, CS03-2009, etc.), defining the masks for frequency response for a receiving path for both electromagnetic and acoustic performance that all user-audio devices (particularly telecommunication devices that come with a handset) must follow. As also noted above, passing the compliance for both acoustic performance and electromagnetic performance simultaneously is very challenging. This is especially true for passing the acoustic compliance standards with an artificial ear (e.g., a "Type 3.3" standard), which is the closest representation to a human ear currently used that can reflect the way people use a listening device (e.g., handset, etc.).

As an example, in order to improve the quality and usability of telephone coupled hearing aids, various methods have been proposed to increase the strength of the electromagnetic signal produced by the handset with a secondary flux coil, both as a means of increasing the electromagnetic signal and as a means of providing additional mounting flexibility. Various other designs have been proposed to pass the compliance test both for acoustics and for electromagnetics, especially for the frequency response.

Notably, there are different types of artificial ears against which acoustic performance may be tested that simulate human ears. A "Type 1" artificial ear, for instance, is one of the original artificial ears to be used to test the acoustic performance, which assumes the device under test (DUT) is closely coupled to a human ear. However, this assumption is not always the case, as the way people use the DUT may differ (e.g., how close to the ear, how much pressure against the ear, etc.). A "Type 3.2" high-leakage and low-leakage artificial ear provides two kinds of acoustic leakage to simulate the way people may be using the DUT. In addition, a "Type 3.3" artificial ear, which includes an artificial head and torso simulator with a simulated pinna (outer ear) is much closer than the Type 1 and Type 3.2 artificial ears in simulating people using the DUT, and allows for adjusting the force between the DUT and the ear pinna.

In order to pass both the acoustic compliance and the electromagnetic compliance, particularly since some of the compliance standards don't dictate the use of the Type 3.3 artificial ear to perform the tests, most manufactures today choose the Type 1 artificial ear to pass the acoustic compliance for a particular device, despite the fact that the same device cannot pass the acoustic compliance test with a Type 3.3 artificial ear. As such, an end user of this particular device can only achieve a satisfied performance with the handset very closely coupled to the ear.

Typically, a telecommunication system handset's receiving path contains an analog component and a digital signal processing component. In order to pass the compliance standards, a filter network applied in either the analog component or digital component is usually necessary. Unfortunately, filtering the input signal to the handset receiver, which is also a kind of speaker, can have an adverse effect on the performance of a secondary flux coil, since both the receiver and the secondary coil utilize the same input signal. An alternative method would be to use a different filter for acoustic and electromagnetic use, but the end user would then need to tell the telecommunication terminal which kind of user behavior is desired, causing inconvenience to the end user. Still another method adopts a passive circuit technique for filtering the input to the secondary flux coil of a handset without altering the receiver for acoustic emission. However, this kind of passive circuit adds the cost of the handset.

As such, most current systems still adopt the same set of filter networks for acoustics and electromagnetics in order to pass the compliance standards, but they can only pass the acoustic compliance with a Type 1 artificial ear.

Figure 1:
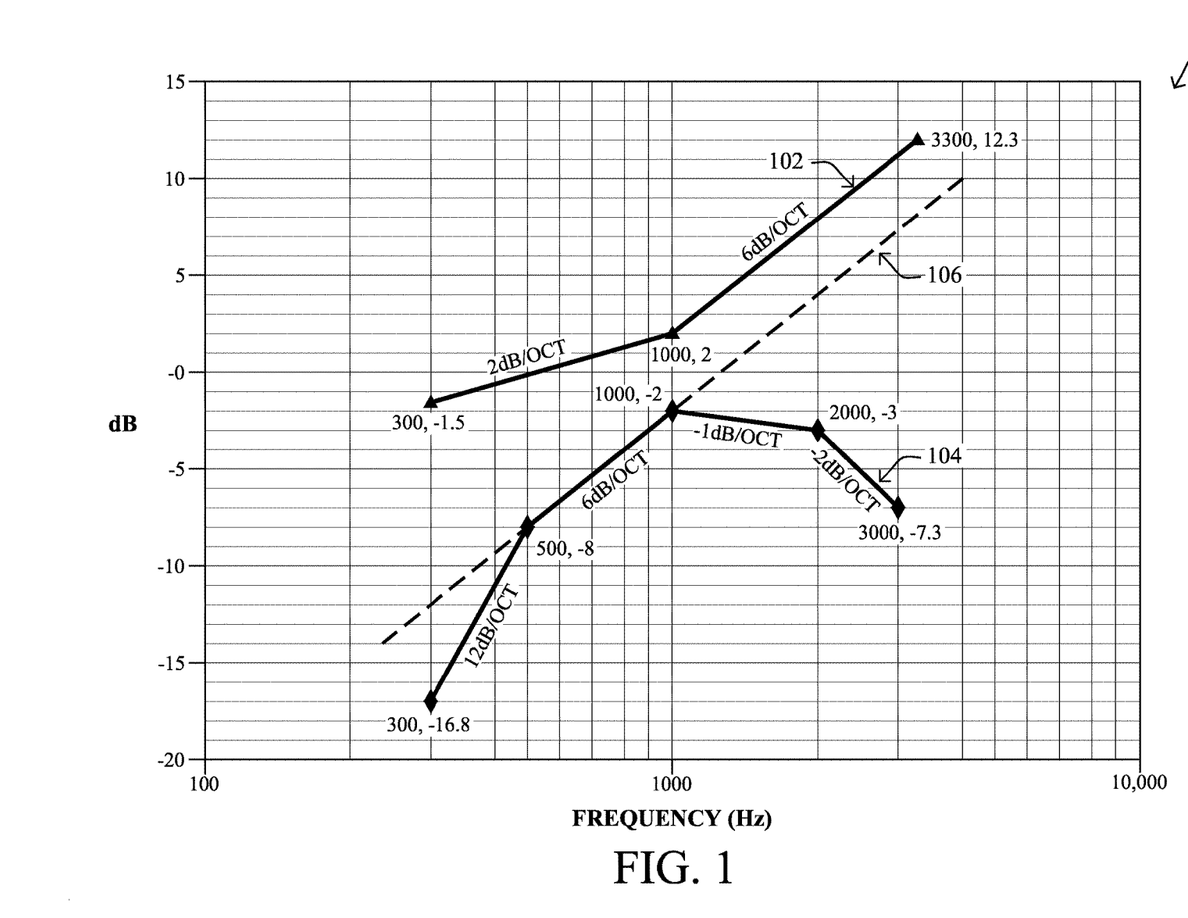
FIG. 1 illustrates an example electromagnetic frequency response mask (e.g., defined in FCC Part68-2008) together with a typical electromagnetic frequency response curve of a handset receiver.

As shown in FIG. 1, and as defined by electromagnetic related standards, the typical electromagnetic frequency response 106 of a handset is a straight curve with about 6 dB/oct slope. In order to fulfill the electromagnetic masks, complying with upper limit 102 and lower limit 104, the maximum boost level at 300 Hz is around 11 dB (the difference between the lower and upper limits), while only 4 dB from 1000 Hz to 3300 Hz. Accordingly, the maximum attenuation level at 2000 Hz is 7 dB. This means that there isn't much room to tune a filter in the mid frequency band from 500 Hz to 2000 Hz, while having a larger range to tune a filter around 300 Hz to boost and above 2000 Hz to attenuate.

Figure 2:
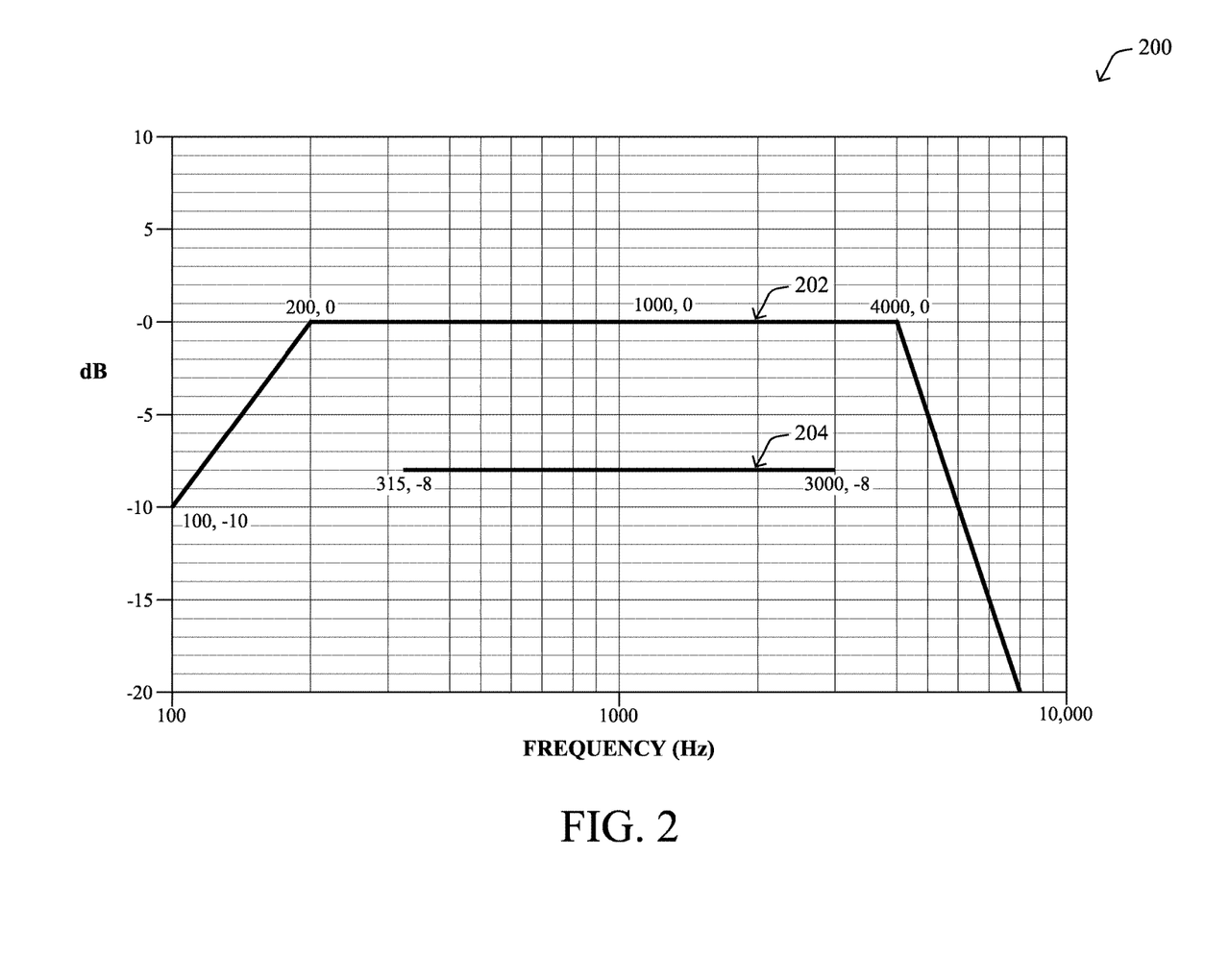
FIG. 2 illustrates an example receiving path acoustic frequency response mask (e.g., as defined in AS/ACIF S004-2008)

As shown in FIG. 2, and as defined by acoustic related standards (upper limit 202 and lower limit 204), there is only an 8 dB tolerance between 315 Hz to 3000 Hz, which is typically very tight for conventional narrowband handset receiver frequency responses at a Type 3.3 artificial ear without any filter. As noted, an alternative way to achieve this tolerance is to pass the acoustic requirement with artificial ear with the same filter network as that for the electromagnetic requirement (Type 1), or to pass the requirement at a Type 3.3 artificial ear with a different filter network as the one used for the electromagnetic requirement.

Accordingly, the present disclosure provides a design and method that passes the acoustic compliance standards with a Type 3.3 artificial ear, which is more aligned to the typical and practical user usage, as well passing the electromagnetic compliance in a very cost effective manner. Therefore, the design herein not only can satisfy the normal human hearing capability with only acoustic coupling in different usage behaviors, but also the hearing capabilities that need the hearing aids or other assistive devices with electromagnetic coupling.

Said differently, the present disclosure provides an audio device (e.g., telephone handset) that could use the same filter to pass both acoustic compliance and electromagnetic compliance standards, where the end user experiences nearly the same audio performance with different coupling manners between the handset and the human ear (e.g., holding positions, force/pressure, etc.). In particular, as described in detail below, through a mechanical change to a conventionally used handset receiver (e.g., a narrowband handset receiver), and/or with an adequate mechanical design of mounting the receiver to the handset, a very cost effective solution is provided.

Figure 3:
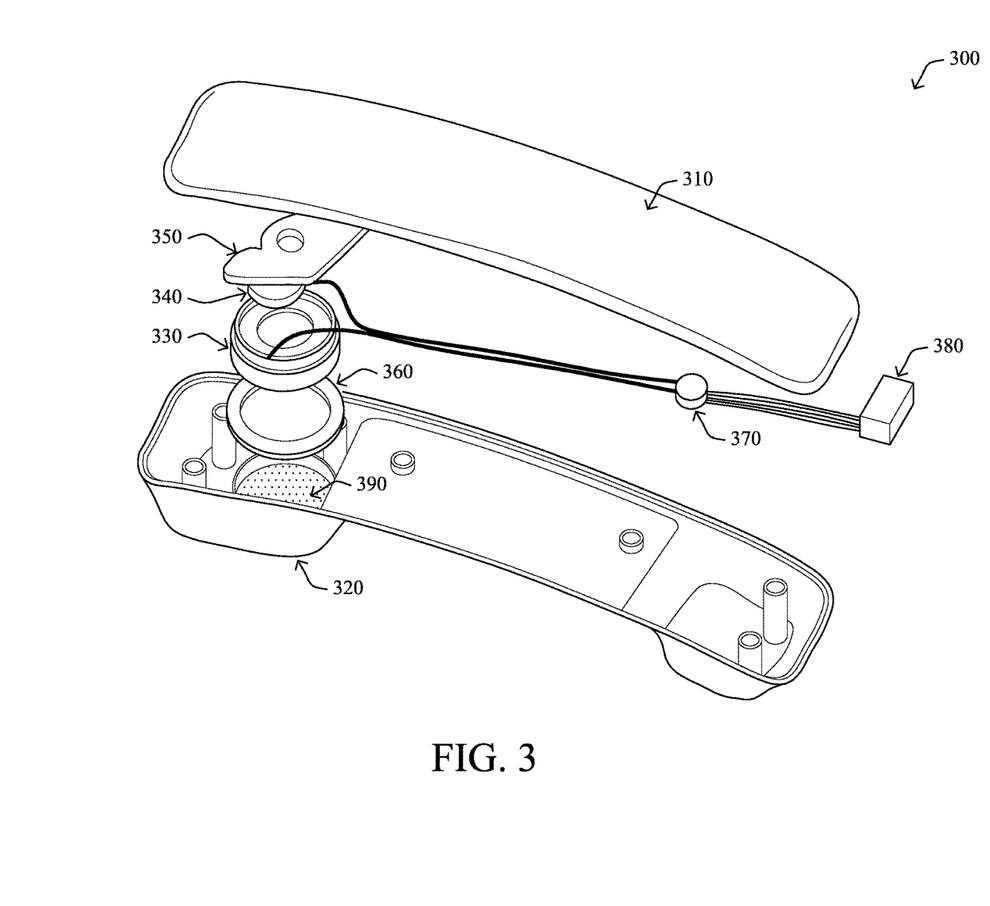
FIG. 3 illustrates an example exploded view of an audio transducer and associated holding device for enhanced acoustic and electromagnetic coupling according to one or more embodiments herein.

FIG. 3 illustrates a high-level exploded view of an example embodiment of a telecommunication (e.g., telephone) handset 300. Note that while a handset 300 is shown, other embodiments herein for what is referred to herein as an "audio transducer holding device 300" may include such things as headsets, and so on, and the use of a handset 300 as one example is not meant to limit the scope of the embodiments herein.

As shown in FIG. 3, the illustrative handset 300 comprises an upper cover 310 of the handset (generally, a "non-ear-facing portion" 310), and lower cover 320 of the handset (generally an "ear-facing portion" 320), which may be some sort of shell, case, etc. that contains the components of the device 300. As will be generally understood, the receiver 330, as it is referred to in the art of handsets, is an audio transducer (hence "audio transducer 330"), where the ear-facing portion 320 and non-ear-facing portion 310 are configured to enclose the audio transducer 330, accordingly. Notably, and as described in further detail below, the ear-facing portion (bottom cover) 320 and non-ear-facing portion (top cover) 310 are configured to hold the audio transducer (receiver) 330 by compressing the ear-facing portion 320 against a front plate of the audio transducer 330 and the non-ear-facing portion 310 against a fixing gasket 340 (which is generally in contact with a driver plate of the audio transducer 330). In one particular embodiment, a compression plate 350 may apply the compression from the non-ear-facing portion 310 to the fixing gasket 340, or in another embodiment may supply its own compressive force on behalf of the top cover (that is, the compression plate 350 may act as a non-ear-facing portion of the holding device 300 that applies the compression to the fixing gasket 340, accordingly).

Other components of the audio transducer holding device 300 may comprise a transducer bracket 360, a microphone 370, a connection port 380, and so on, and the device 300 may define a plurality of apertures 390 or other spaces which allow sound to travel outside of the device 300 and to the user's ear. The view in FIG. 3 is simplified, and is not meant to be a complete representation of an illustrative handset. For example, compression between the top and bottom covers may be created by various screws or compressive "snap-in" connectors, and such elements are not explicitly shown herein. Also note that the general shapes shown herein are also not meant to be limiting to the scope of the embodiments herein.

Figure 4:
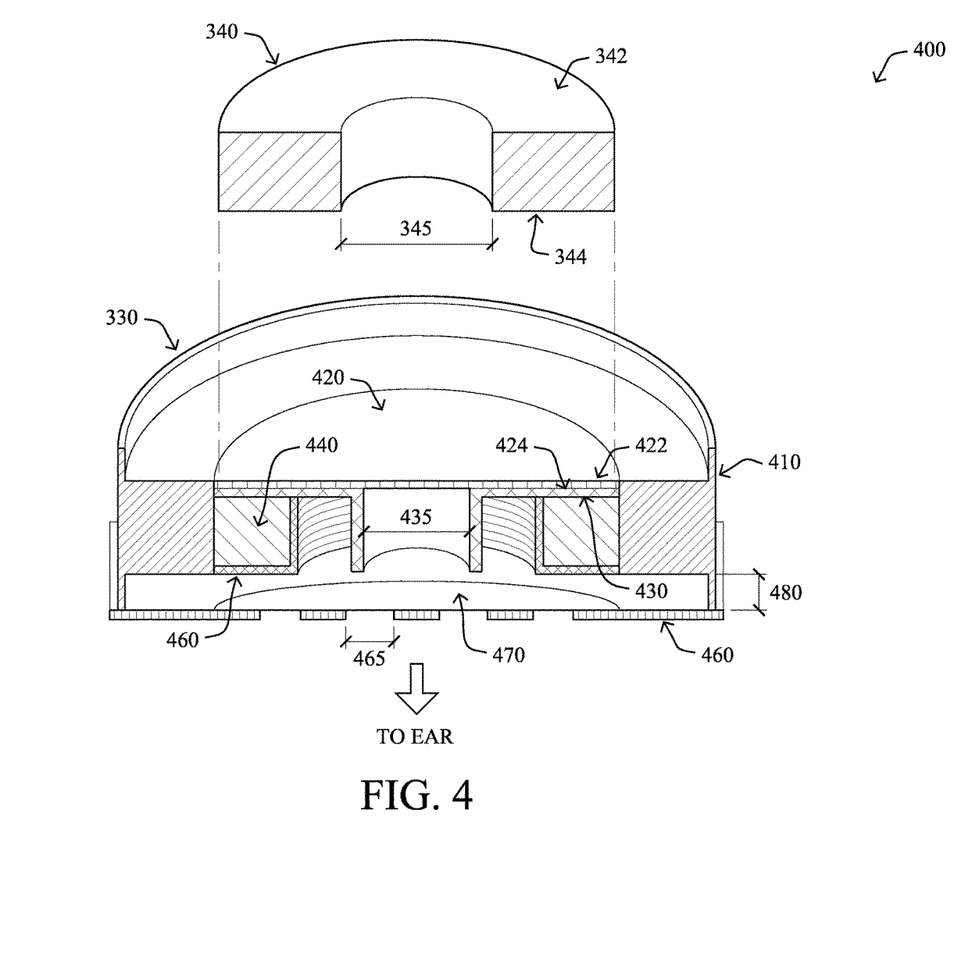
FIG. 4 illustrates an example mechanical view of an audio transducer for enhanced acoustic and electromagnetic coupling according to one or more embodiments herein.

FIG. 4 illustrates a more detailed example of an audio transducer 330 for enhanced acoustic and electromagnetic coupling according to one or more embodiments herein. In particular, as shown in FIG. 4, the example audio transducer 330 comprises a rigid housing 410 that substantially circumferentially surrounds an audio driver plate 420, (without substantially covering the ear-facing side 422 and non-ear-facing side 424 of the audio driver plate 420). The audio driver plate 420 (e.g., a vibrating diaphragm) is mounted or supported within the housing 410, and is driven by a supporting driver system. Such an example driver system (e.g., a dynamic drive) may comprise a yoke 430 that is positioned at a center portion of the driver and surrounded by a voice coil 450, where a permanent magnet 440 is positioned behind both the audio driver plate 420 and the voice coil 450. The voice coil 450 is connected to an electrical wire (not shown) which further connects to an audio source, thereby providing an electrical audio signal. This electrical audio signal increases or decreases the charge on the voice coil 450 and vibrates the audio driver plate (e.g., diaphragm) 420 via the yoke 430 (i.e., the yoke supplies vibration movement to the audio driver plate), displacing air and creating sound toward the ear (e.g., through a sound hole 435 of yoke 430, e.g., a centrally located sound aperture which may be located on the ear-facing side of the audio driver plate).

The audio transducer 330 may also comprise a front plate 460 mounted generally on the ear-facing side of the audio driver plate (e.g., mounting physically to the rigid housing 410) and spaced apart from the audio driver plate (space 480, which extends within the entire volume of the transducer between the front plate and the audio driver plate). The front plate 460 may comprise a plurality of apertures 465 to allow for audio passage toward the ear, and a dust cover 470 may prevent contamination from passing through such apertures, accordingly.

In accordance with one or more embodiments of the present disclosure, a fixing gasket 340 (correspondingly with a non-ear-facing side or face 342 and an ear-facing side or face 344) may be affixed to the non-ear-facing side 422 of the audio driver plate 420. Generally, though not necessarily, face 344 of the fixing gasket that contacts the audio driver plate 420 does not also contact the rigid housing 410. The fixing gasket 340 may comprise a flexible material, such as any known gasket material (e.g., foam, rubber, cork, plastic, etc.). In addition, the fixing gasket 340 may comprise an aperture 345 configured to allow air passage to the non-ear-facing side 422 of the audio driver plate 420. Note that in one embodiment, the aperture 345 of the fixing gasket is substantially centrally located through the fixing gasket 340, and may be substantially sized (e.g., and shaped) to conform to a size of the sound aperture 435 of the yoke 430.

As shown below in FIG. 5B, the front plate 460 is adapted to be compressed against an ear-facing portion 320 of an audio transducer holding device 300, and the fixing gasket 340 is adapted to be compressed against a non-ear-facing portion 310 of the audio transducer holding device, such that the audio transducer 330 is held within the audio transducer holding device by compressive force on both the fixing gasket and the front plate. The fixing gasket 340, arranged in this manner, changes the audio characteristics of the audio transducer 330 by changing the acoustic receiver frequency response (without changing the electromagnetic field frequency response since it is a mechanical design), resulting in a more uniform testing result as described below.

Figure 5A:
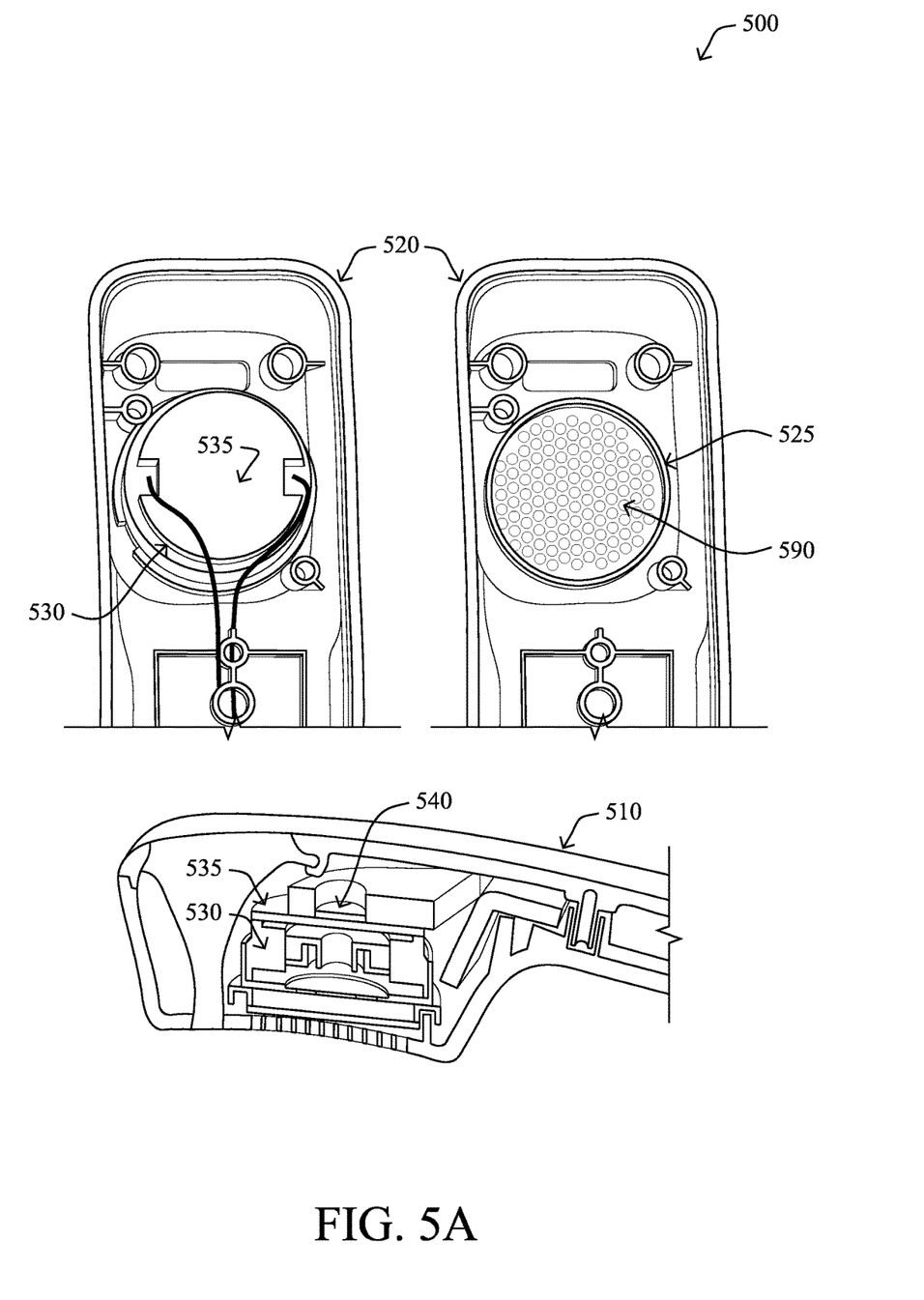
FIGS. 5A-5B illustrate example mechanical views comparing a conventional system to an audio transducer and associated holding device for enhanced acoustic and electromagnetic coupling according to one or more embodiments herein.
Figure 5B:
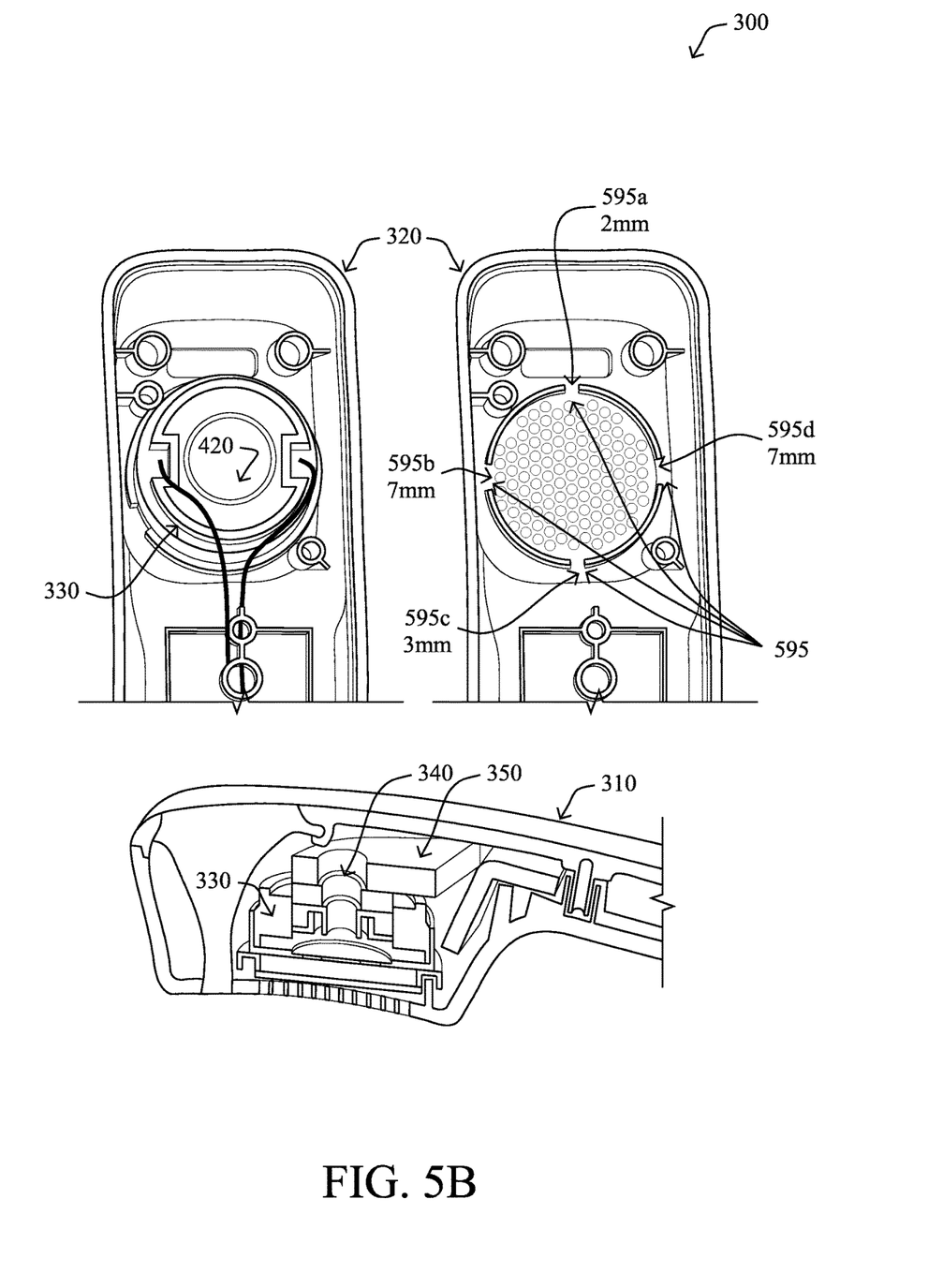

FIGS. 5A and 5B taken together illustrate the mechanical contrast between conventional systems (FIG. 5A) and the embodiments of the present disclosure (FIG. 5B), and illustrate further features of various embodiments herein. In particular, as shown in FIG. 5A, conventional audio transducer (handset receiver) 530 is shown in the ear-facing portion 520 of the handset device 500, where a plastic cover 535 seals the back (non-ear-facing side) of audio transducer 530. Outside of the plastic cover, a fixing gasket 540 is used for mechanical fixing to the non-ear-facing portion 510 of the handset.

Conversely, as shown in FIG. 5B, the audio transducer 330 (handset receiver) according to one or more of the embodiments herein, specifically excludes any cover 535, exposing the audio driver plate 420. The fixing gasket 340 of the embodiments herein thus contacts the audio driver plate 420, and may have a through-hole to let the air circulate, as mentioned above. (Note that the non-ear-facing portion of the audio transducer holding device, particularly compression plate 350, may also comprise an aligned aperture configured to allow air passage from within the audio transducer holding device 300 to the non-ear-facing side of the audio driver plate, accordingly.)

In addition, in one or more specific embodiments herein, acoustic leakage paths may be specially designed on the handset lower cover. For instance, as shown in FIG. 5A, the ear-facing portion 520 of the holding device 500 may comprise a raised lip 525 (e.g., circular in shape) onto which the audio transducer 530 rests, sealing the air flow and audio flow from escaping into the device 500, thus creating a direct passage of any air flow or audio flow from the transducer 530 through the apertures 590 toward the ear. However, as shown in FIG. 5B, one or more embodiments here may also have one or more acoustic leakage pathways 595 formed between the front plate 460 and the ear-facing portion/cover 320 of the audio transducer holding device 300 when the front plate is compressed against the ear-facing portion of the audio transducer holding device (or more generally between the audio transducer 330 and the ear-facing portion/cover 320, since the transducer may not have a front plate, or else since the front plate 460 may contact a transducer bracket 360, which in-turn contacts the ear-facing portion/cover 320). The one or more acoustic leakage pathways 595 are configured to allow audio passage from the audio transducer 330 into an interior of the audio transducer holding device 300, thus further changing the audio characteristics of the system.

In one embodiment, the one or more acoustic leakage pathways 595 may be substantially formed within the front plate 460 (or audio transducer 330 generally or transducer bracket 360). However, as shown in FIG. 5B, the one or more acoustic leakage pathways 595 may be substantially formed within the ear-facing portion 320 of the audio transducer holding device 300 (e.g., within a lip 525, as in FIG. 5A). Illustratively, the pathways 595 comprise four pathways (595a-d), which are illustratively located substantially 90-degrees apart from respectively adjacent pathways of the four pathways. Example dimensions are shown (e.g., 7 mm, 3 mm, and 2 mm), but the dimensions, locations, orientations, relationship, etc., are not meant in any way to limit the scope of the embodiments herein. For example, all of the dimensions could be the same, or else they may be differently sized pathways as shown, or else a different number of pathways may be used, and so on.

To explain the benefit of the embodiments herein, three different situations of using the illustrative handset are selected as test conditions:
  A Type 1 ear for close coupling;
  10N (Newtons) between the handset and a Type 3.3 artificial ear pinna, which is also defined as the high leakage position on the Type 3.3 ear simulator in the standard TIA 810B-2006; and
  18N between the handset and a Type 3.3 artificial ear pinna, which is also defined as low leakage position on a Type 3.3 ear simulator in the standard TIA 810B-2006.

Figure 6A:
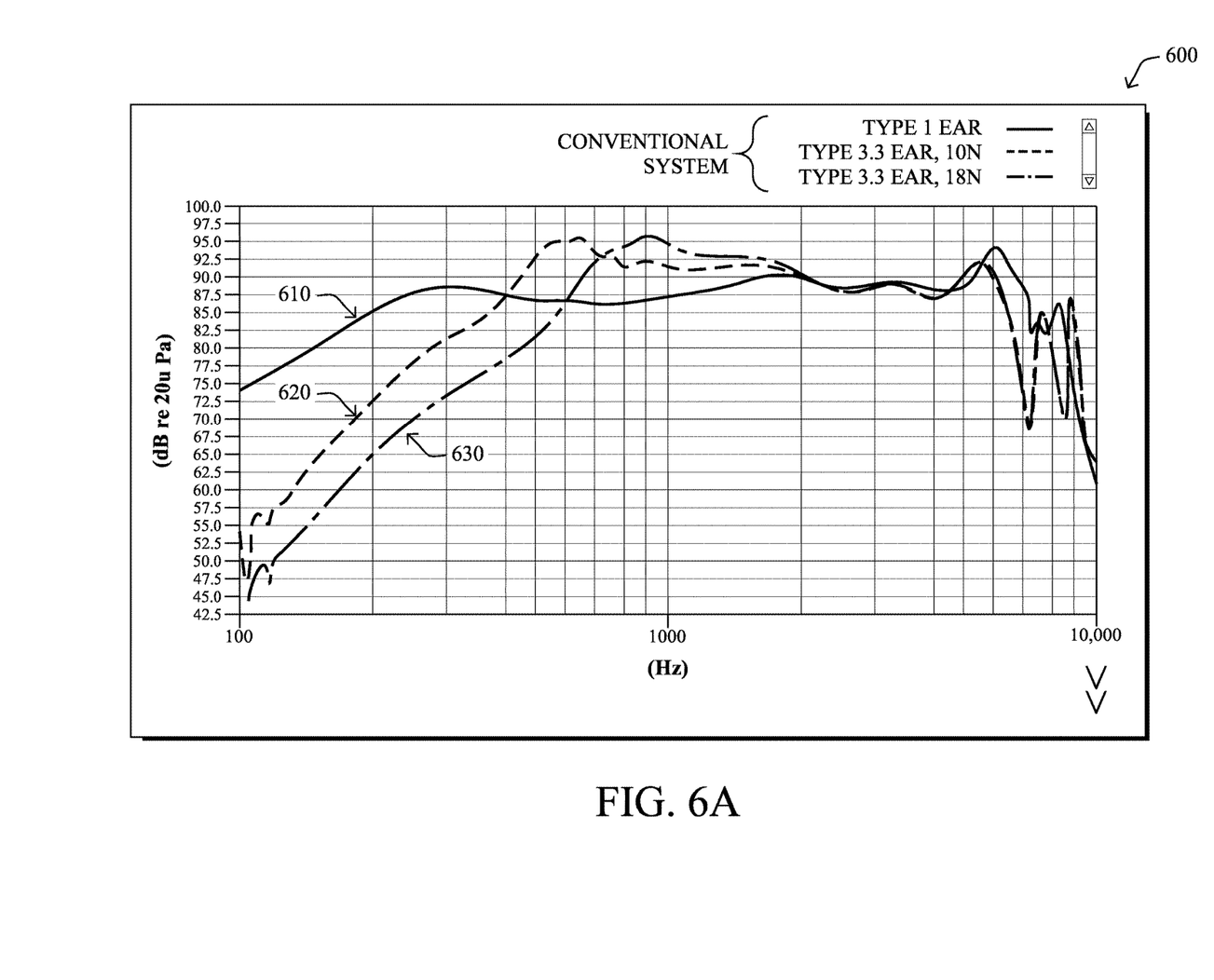
FIG. 6A illustrates an example receiving path frequency response curve of a conventional device measured in a Type 1 artificial ear and a Type 3.3 artificial ear with 10N and 18N force to the ear.

As shown in FIG. 6A, curve 610 is the receiving frequency response at a Type 1 artificial ear for conventional systems (e.g., that shown in FIG. 4A). Curve 620 is the receiving frequency response at a Type 3.3 artificial ear in the low leakage position with 18N force for the conventional system, while curve 630 is the receiving frequency response at a Type 3.3 artificial ear in the high leakage position with 10N force for the conventional system. As can be seen, curve 610, curve 620, and curve 630 are quite different, especially at low frequencies. For example, there is about a 16 dB difference between curve 610 and curve 630 at 300 Hz, which will cause a subjective and noticeable difference for different manners of using the handset. Further, curve 630 has a noticeable lack of low frequency and more than 20 dB difference between the response at 300 Hz and its first peak at about 900 Hz. In this case, boosting to compensate for the lack of low frequency energy from 300 Hz to 900 Hz for acoustics will also change the electromagnetic field frequency response by the same dB value, thus causing failure of the related electromagnetic requirement. In order to pass the electromagnetic field frequency response in this instance, another inverse filter network in the electromagnetic field path would be needed, thus causing extra effort and cost.

Figure 6B:
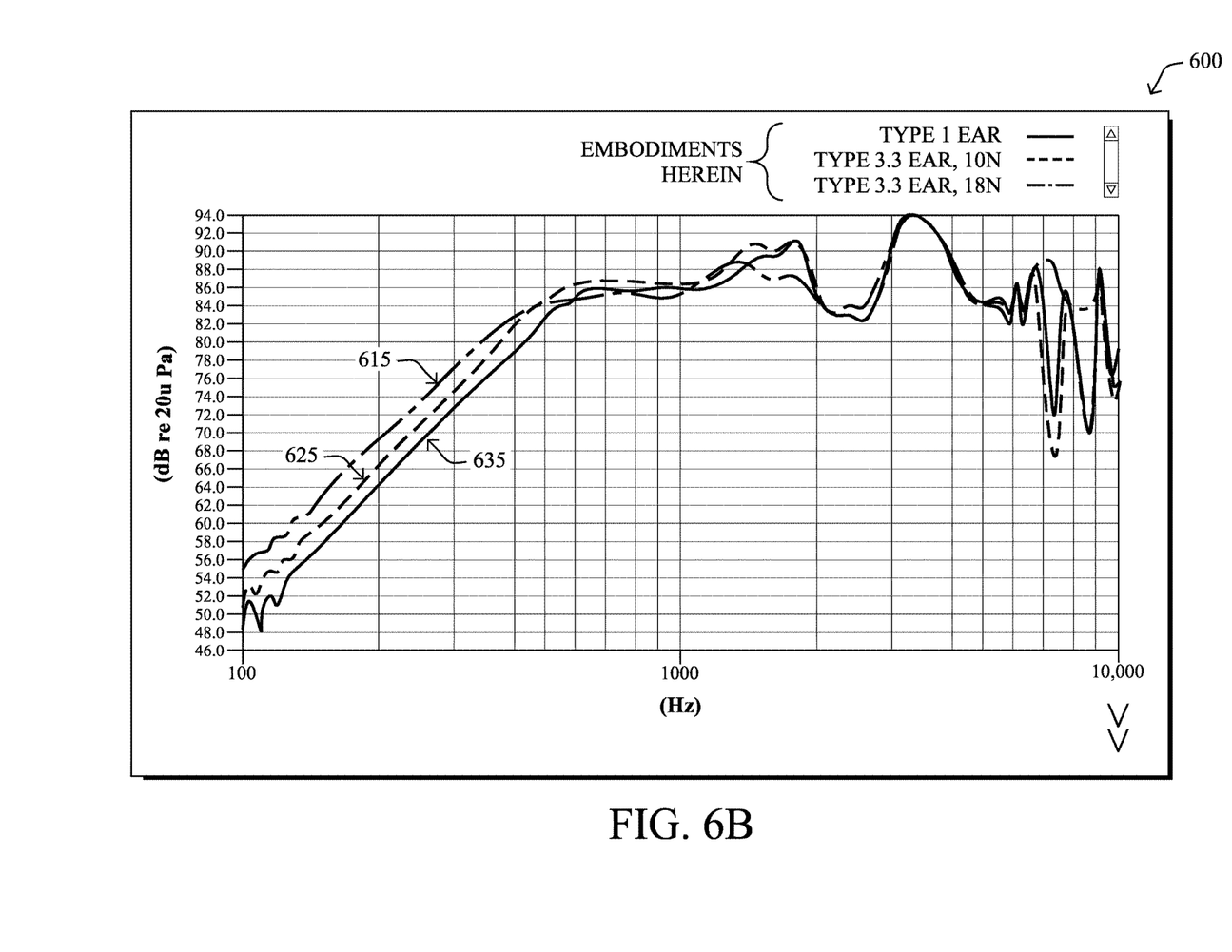
FIG. 6B illustrates an example receiving path frequency response curve of an audio transducer and associated holding device for enhanced acoustic and electromagnetic coupling according to one or more embodiments herein measured in a Type 1 artificial ear and a Type 3.3 artificial ear with 10N and 18N force to the ear.

Conversely, as shown in FIG. 6B, curve 615 is the receiving frequency response at a Type 1 artificial ear for an audio transducer and associated holding device for enhanced acoustic and electromagnetic coupling as described herein, while curve 625 is the corresponding receiving frequency response at a Type 3.3 artificial ear low leakage position with 18N force, and curve 635 is the receiving frequency response at a Type 3.3 artificial ear of high leakage position with 10N force. As can be seen, curve 615, curve 625, and curve 635 are similar, for example only about 4-5 dB difference at 300 Hz between curve 615 and curve 635. This characteristic allows for subjective results to be generally similar for different manners of using the handset. Further, for curve 635, the response difference at 300 Hz and 1000 Hz is about 13 dB, allowing the use of only one filter in order to pass both acoustic compliance and electromagnetic field compliance. Since this acoustic receiver frequency response change is achieved by only changing the mechanical design of the device, the electromagnetic field frequency response will not change for the system (i.e., audio transducer and associated holding device for enhanced acoustic and electromagnetic coupling) described herein.

Figure 7A:
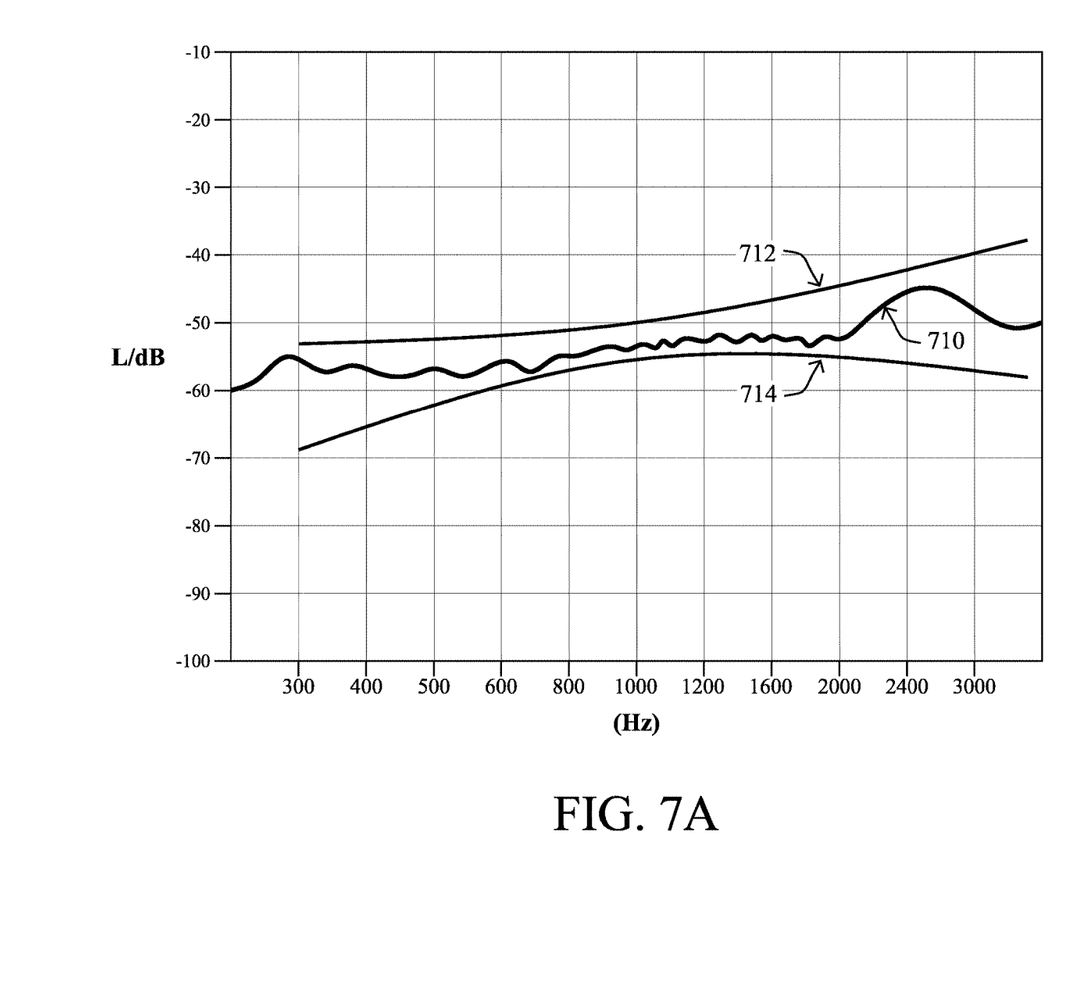
FIG. 7A illustrates an example frequency response curve of an audio transducer and associated holding device for enhanced acoustic and electromagnetic coupling according to one or more embodiments herein, illustratively passing the FCC Part68-2008 for an electromagnetic field mask with a filter.
Figure 7B:
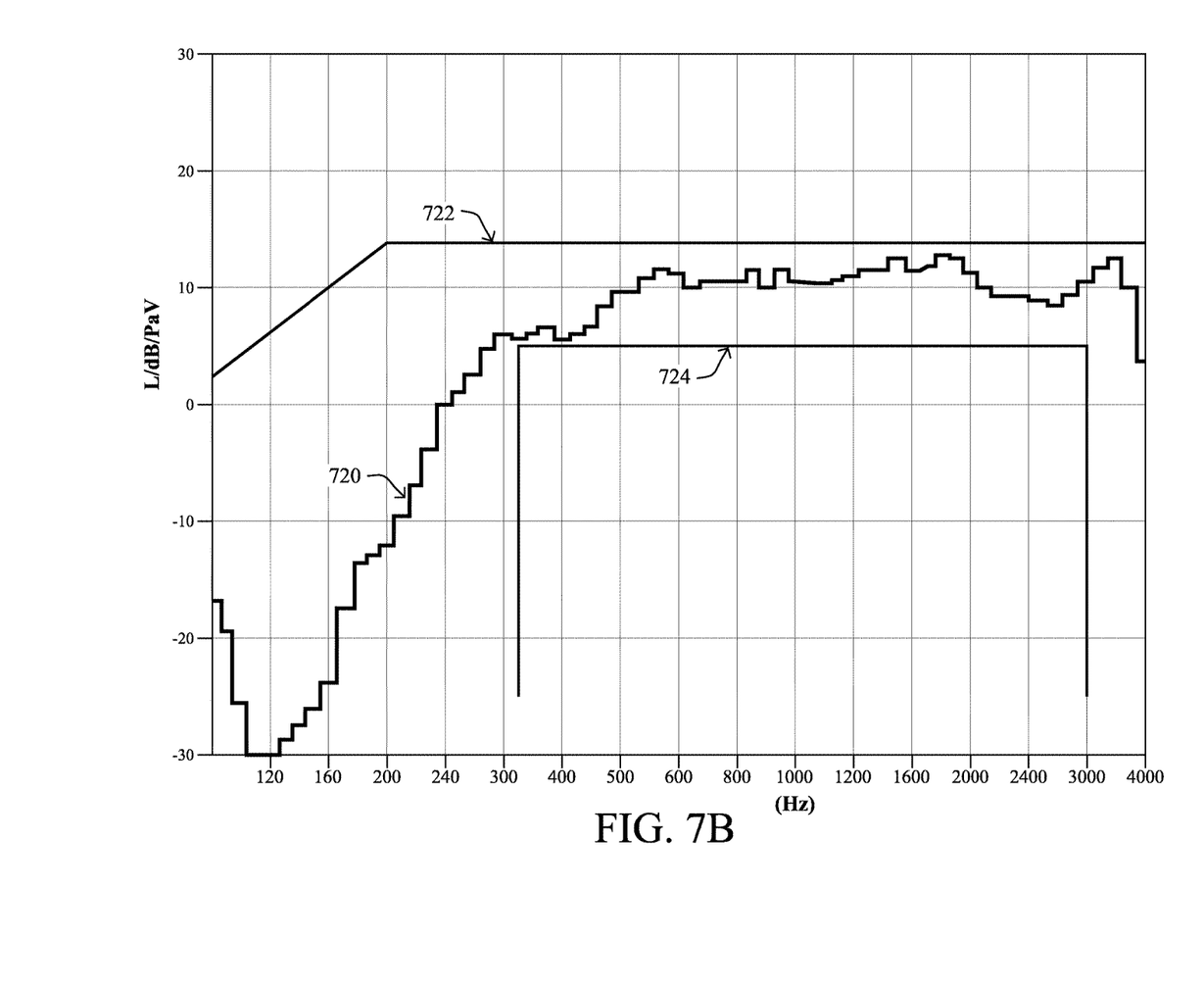
FIG. 7B illustrates an example frequency response curve of an audio transducer and associated holding device for enhanced acoustic and electromagnetic coupling according to one or more embodiments herein, illustratively passing the AS/ACIF 5004-2008 mask for acoustic compliance with the same filter at a Type 3.3 artificial ear at the high leakage position defined at TIA 810B-2006.

Lastly, as an example, FIG. 7A illustrates an example frequency response curve 710 of the embodiments herein passing the FCC Part68-2008 for electromagnetic field mask with a filter (between upper limit 712 and lower limit 714), while FIG. 7B illustrates an example frequency response curve 720 for the embodiments herein passing the AS/ACIF S004-2008 mask for acoustic compliance with the same filter as in FIG. 7A at a Type 3.3 artificial ear at the high leakage position defined at TIA 810B-2006 (between upper limit 722 and lower limit 724).

The embodiments described herein, therefore, provide for an audio transducer and associated holding device for enhanced acoustic and electromagnetic coupling. In particular, the embodiments herein require only one filter to pass the compliance for both acoustic measurement, based on both Type 3.3 and Type 1 artificial ear test cases, and electromagnetic measurement, which can save the additional filter network and additional cost of passive networks for electromagnetic field frequency response. In addition, since the acoustic receiving frequency responses are very similar within a wide range of acoustic leakage between the handset and the human ear, the embodiments herein can satisfy the very wide range of normal users with only acoustic coupling. Further, since different people have a different manner of using a handset (i.e., with different acoustic leakage between handset and ear), the embodiments herein can be used by different people while still providing generally the same acoustic performance for each individual user.

While there have been shown and described illustrative embodiments that provide an audio transducer and associated holding device for enhanced acoustic and electromagnetic coupling, it is to be understood that various other adaptations and modifications may be made within the spirit and scope of the embodiments herein. For example, the embodiments have been shown and described herein with general relation to narrowband handsets. However, the embodiments in their broader sense are not as limited, and may, in fact, be used with other types of audio transducers, such as headsets, headphones, or other types of handsets. In addition, while certain protocols and standards are shown, such as the various artificial ear testing types or acoustic and electromagnetic standards, other suitable protocols and standards may be used, accordingly.

The foregoing description has been directed to specific embodiments. It will be apparent, however, that other variations and modifications may be made to the described embodiments, with the attainment of some or all of their advantages. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. An apparatus, comprising:
    an audio transducer, wherein the audio transducer is a receiver;
    an audio driver plate of the audio transducer, the audio driver plate having an ear-facing side and a non-ear-facing side;
    a rigid housing of the audio transducer, the rigid housing substantially circumferentially surrounding the audio driver plate without substantially covering the ear-facing side and non-ear-facing side of the audio driver plate;
    a front plate of the audio transducer, the front plate mounted on the ear-facing side of the audio driver plate and spaced apart from the audio driver plate;
    a fixing gasket affixed to the non-ear-facing side of the audio driver plate; and
    one or more acoustic leakage pathways formed between the front plate and the ear-facing portion of the audio transducer holding device when the front plate is compressed against the ear-facing portion of the audio transducer holding device, the one or more acoustic leakage pathways configured to allow audio passage from the audio transducer into an interior of the audio transducer holding device,
    wherein the front plate is adapted to be compressed against an ear-facing portion of an audio transducer holding device and the fixing gasket adapted to be compressed against a non-ear-facing portion of the audio transducer holding device, whereby the audio transducer is adapted to be held within the audio transducer holding device by compressive force on both the fixing gasket and the front plate.

2. The apparatus as in claim 1, wherein the fixing gasket comprises an aperture configured to allow air passage to the non-ear-facing side of the audio driver plate.

3. The apparatus as in claim 2, further comprising:
    a yoke of the audio transducer configured to supply vibration movement to the audio driver plate, the yoke having a centrally located sound aperture and being located on the ear-facing side of the audio driver plate;
    wherein the aperture of the fixing gasket is substantially centrally located through the fixing gasket and is substantially sized to conform to a size of the sound aperture of the yoke.

4. The apparatus as in claim 2, wherein the non-ear-facing portion of the audio transducer holding device comprises an aligned aperture configured to allow air passage from within the audio transducer holding device to the non-ear-facing side of the audio driver plate.

5. The apparatus as in claim 1, wherein the one or more acoustic leakage pathways are substantially formed within the front plate.

6. The apparatus as in claim 1, wherein the one or more acoustic leakage pathways are substantially formed within the ear-facing portion of the audio transducer holding device.

7. The apparatus as in claim 1, wherein the one or more acoustic leakage pathways comprise four pathways located substantially 90-degrees apart from respectively adjacent pathways of the four pathways.

8. The apparatus as in claim 1, wherein the one or more acoustic leakage pathways comprise a plurality of pathways, wherein the plurality of pathways comprise at least two differently sized pathways.

9. The apparatus as in claim 1, wherein a face of the fixing gasket that contacts the audio driver plate does not also contact the rigid housing.

10. The apparatus as in claim 1, wherein the audio transducer holding device is a telephone handset.

11. The apparatus as in claim 1, wherein the fixing gasket comprises a flexible material selected from a group consisting of: foam; rubber; cork; and plastic.

12. An audio transducer holding device, comprising:
    an ear-facing portion;
    a non-ear-facing portion, wherein the ear-facing portion and non-ear-facing portion are configured to enclose an audio transducer, wherein the audio transducer is a receiver, the audio transducer comprising:
        i) an audio driver plate having an ear-facing side and a non-ear-facing side;
        ii) a rigid housing substantially circumferentially surrounding the audio driver plate without substantially covering the ear-facing side and non-ear-facing side of the audio driver plate; and
        iii) a front plate mounted on the ear-facing side of the audio driver plate and spaced apart from the audio driver plate;
    a fixing gasket configured to compress on a first side against the non-ear-facing side of the audio driver plate and on a second side against the non-ear-facing portion; and
    one or more acoustic leakage pathways formed between the front plate and the ear-facing portion of the audio transducer holding device when the front plate is compressed against the ear-facing portion of the audio transducer holding device, the one or more acoustic leakage pathways configured to allow audio passage from the audio transducer into an interior of the audio transducer holding device,
    wherein the ear-facing portion and non-ear-facing portion are configured to hold the audio transducer by compressing the ear-facing portion against the front plate and the non-ear-facing portion against the fixing gasket.

13. The audio transducer holding device as in claim 12, wherein the fixing gasket comprises an aperture configured to allow air passage to the non-ear-facing side of the audio driver plate.

14. The audio transducer holding device as in claim 13, wherein the non-ear-facing portion of the audio transducer holding device comprises an aligned aperture configured to allow air passage from within the audio transducer holding device to the non-ear-facing side of the audio driver plate.

15. The audio transducer holding device as in claim 12, wherein the one or more acoustic leakage pathways are substantially formed within the ear-facing portion of the audio transducer holding device.

16. The audio transducer holding device as in claim 12, wherein the one or more acoustic leakage pathways comprise four pathways located substantially 90-degrees apart from respectively adjacent pathways of the four pathways.

17. The audio transducer holding device as in claim 12, wherein the one or more acoustic leakage pathways comprise a plurality of pathways, wherein the plurality of pathways comprise at least two differently sized pathways.

18. The audio transducer holding device as in claim 12, wherein the audio transducer holding device is a telephone handset.

* * * * *